Feb. 22, 1955 J. G. BRIGGS 2,702,852

AUTOMATIC FREQUENCY CONTROL CIRCUIT

Filed May 29, 1953

INVENTOR.
JOHN G. BRIGGS
BY Marvin Moody
ATTORNEY

United States Patent Office 2,702,852

Patented Feb. 22, 1955

2,702,852

AUTOMATIC FREQUENCY CONTROL CIRCUIT

John G. Briggs, Pacoima, Calif., assignor to Collins Radio Company, Cedar Rapids, Iowa, a corporation of Iowa Application May 29, 1953, Serial No. 358,495

4 Claims. (Cl. 250—20)

Figures 1, 2:
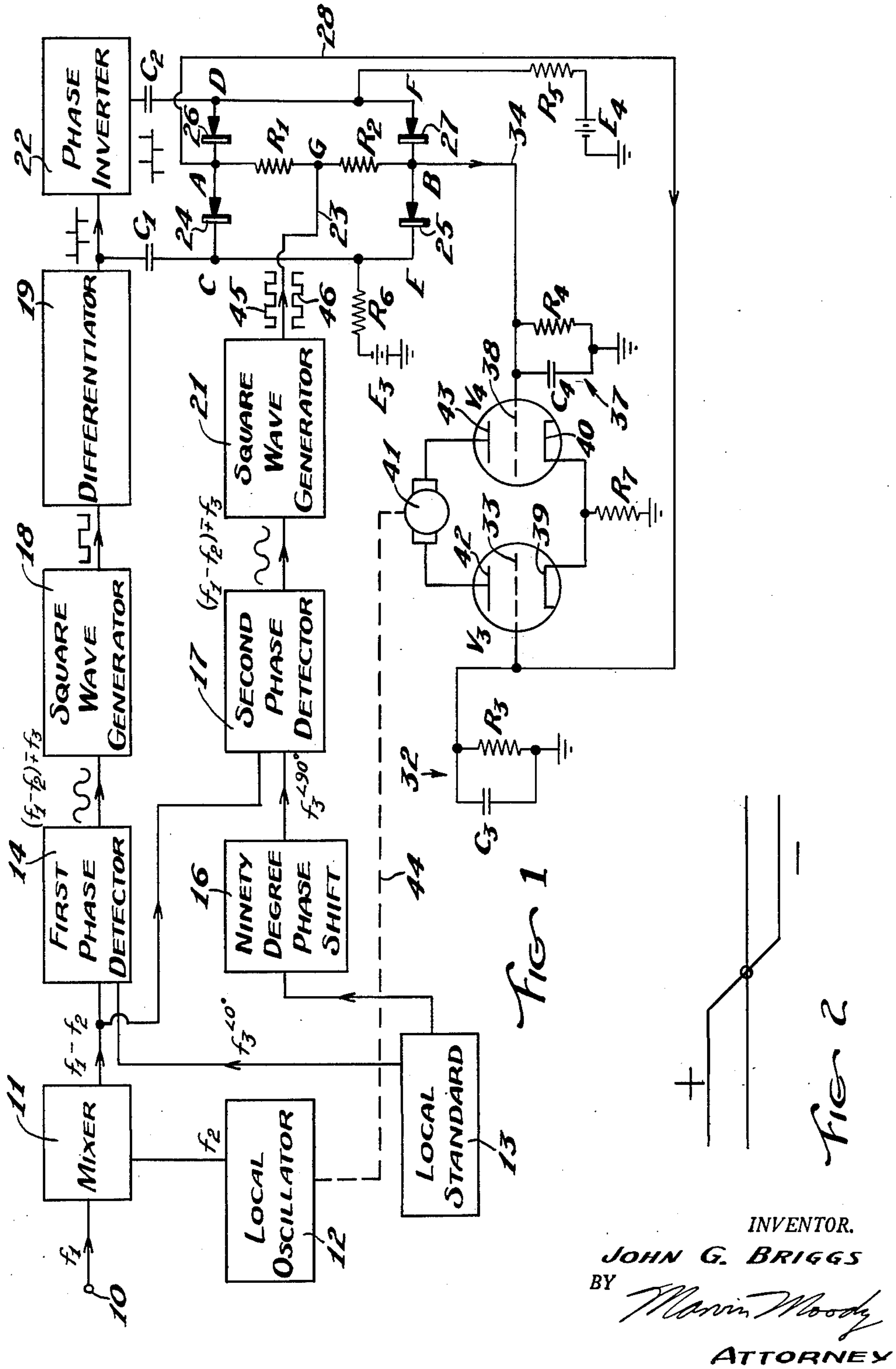

This invention relates in general to automatic frequency control systems, and in particular to a system which is controlled by a direct current motor.

In electronics it is oftentimes desirable to maintain a frequency at a particular value so that it may pass through various circuitry which are designed for that particular frequency. For example, most superheterodyne type receivers have intermediate frequency stages which must receive a signal within frequency limits to pass therethrough. Such intermediate frequencies are generally stabilized by the use of a tunable local oscillator controllable by a two-phase alternating current motor which adjusts the frequency of the local oscillator so that the output of a mixer receiving the local oscillator and the incoming signal will be stabilized. Such a two phase alternating current motor system is shown and disclosed in the patent to Arthur A. Collins #2,617,985, issued November 11, 1952. There are certain advantages obtainable with a direct current motor which may be operated in a more stable fashion than an alternating current motor, and it is an object of this invention to provide an automatic frequency control system which utilizes a direct current motor as the controlling element in the circuit.

Another object of this invention is to provide an improved automatic frequency control system which will maintain a fixed intermediate frequency.

Yet another object of this invention is to provide an automatic frequency control system including a reversible direct current motor of great inherent stability.

A feature of this invention is found in the provision for a mixer which receives an incoming signal and an output of a local tunable oscillator and a pair of phase detectors which receive the output of the mixer and compare it with a pair of outputs from a local standard which are separated in phase by ninety degrees and feeds the output to a direct current motor control system coupled to the tunable local oscillator.

Further features, objects and advantages of the invention will become apparent from the following description and claims when read in view of the drawings, in which:

Figure 1 is a schematic illustration of the automatic frequency control of this invention; and Figure 2 is a curve illustrating the control voltage applied to the direct current motor as a function of frequency error.

Figure 1 illustrates an input terminal 10 which is connected to a mixer 11 that also receives an input from a local tunable oscillator 12.

The mixer 11 mixes inputs from the terminal 10 and oscillator 12 and produces the sum and difference frequencies. It is assumed that the mixer contains an internal filter which eliminates one of the frequency components and passes the other.

A local standard oscillator 13 which might be, for example, a temperature controlled crystal oscillator, produces a pair of outputs. One of them goes to a first phase detector 14 and the second output goes to a ninety degree phase shift circuit 16.

The mixer 11 also supplies an input to the phase detector 14 and the phase detector 14 produces a sine wave output with a frequency equal to the difference frequency between the outputs of the local standard and the mixer.

A second phase detector 17 also receives the output of the mixer 11 and the output of the phase shift circuit

16 and produces an output which has a frequency equal to the output of the first phase detector.

A first square wave generator 18 receives the output of the first phase detector 14 and converts th e sine wave to a square wave. A differentiator 19 receives the output of the square wave generator 18 and produces a series of positive and negative pulses coinciding respectively with the edges of the square wave input. A second square wave generator 21 receives the output of the second phase detector 17 and produces a square wave.

A phase inverter 22 receives an output from the differentiator 19 and inverts the phase of the positive and negative pulses. The output of the square wave generator 21 is connected by a lead 23 to a point G between a pair of resistors $R_1$ and $R_2$ which are connected in series between points A and B.

A condenser $C_1$ is connected to the output of the differentiator 19 and has its opposite side connected to a pair of diode rectifiers 24 and 25 which have their opposite sides connected respectively to points A and B. The opposite side of $C_1$ is also connected to a resistor $R_6$. The opposite side of $R_6$ is connected to a negative voltage $E_3$.

Third and fourth diode detectors 26 and 27 have one side connected respectively to the points A and B and their opposite sides connected together and to a resistor $R_5$ and to a condenser $C_2$. The opposite side of the resistor $R_5$ is connected to a positive voltage $E_4$ and the opposite side of the condenser $C_2$ is connected to the output of the phase inverter 22.

The diode rectifiers may be of the selenium diode type and are connnected so that current flows between the resistors $R_5$ and $R_6$ but not in the opposite direction.

A lead 28 is connected to point A and to a first integrating circuit 32 and to the grid of a tube $V_3$.

Point B is connected by a lead 34 to a second integrating circuit 37 comprising a condenser $C_4$ and $R_4$ which are connected between lead 34 and ground.

The lead 34 is also connected to the control grid 38 of triode $V_4$.

The cathodes 39 and 40 of tubes $V_3$ and $V_4$ are connected together and to a resistor $R_7$. The opposite end of resistor $R_7$ is connected to ground. A direct current motor 41 is connected between the plates 42 and 43 of tubes $V_3$ and $V_4$. This motor might be, for example, a Holtzer Cabot type 0810 motor.

The output shaft 44 of the motor 41 is connected to a frequency controlling element in the local oscillator 12.

In operation, an incoming signal which has a frequency of $f_1$ is mixed with a signal $f_2$ from the local oscillator 12 in the mixer 11. The selected frequency component from the mixer might be either $f_1-f_2$ or $f_1+f_2$, but is nearly always the difference frequency. This output is compared in the phase detector 14 with the output $f_3$ from the local standard 13.

The frequency of the output of the phase detector will be equal to the difference between the frequency $f_3$ from the local standard and the frequency output of the mixer.

The output $f_3$ of the local standard is also fed to the ninety degree phase shift network 16 which supplies an input to the second phase detector 17. The second phase detector 17 also receives an input from the mixer 11 and produces an output which has the same frequency as the output of the first phase detector. However, the outputs of the first and second phase detectors differ by a phase angle of ninety degrees because of the action of network 16. If the output of the mixer is higher in frequency than the output of the local standard, the output of one of the phase detectors will lead the output of the other phase detector by ninety degrees, whereas if the output of the mixer is lower in frequency than the local standard output, the output of the one phase detector will lag the other phase detector by ninety degrees.

Stated otherwise, the phase relationship between the outputs of the first and second phase detectors is determined by the relative frequencies of the output of the mixer and local standard and this phase angle changes when the output frequency of the local standard becomes greater or less than the output of the mixer.

The outputs of the first and second phase detectors are supplied to the square wave generators 18 and 21 which form square wave outputs. If the output of the square wave generator 18 is chosen as a reference, the output of the second square wave generator 21 will either lag or lead that output by ninety degrees. This is shown by the pair of square waves 45 and 46 in the output of the square wave generator 21.

The differentiator 19 receives the square wave from the square wave generator 18 and changes it into positive and negative pulses coinciding with the vertical portions of the wave front in the square wave. The phase inverter 22 inverts the phase of the output of the differentiator 19.

The outputs of the phase inverter and differentiator are coupled, respectively, to points C and D through the coupling condensers $C_1$ and $C_2$. The output of the square wave generator 21 is connected to point G and passes to points A and B through resistors $R_1$ and $R_2$. When the wave form is positive it is shorted to the negative supply through diode rectifiers 24 and 25 and through resistor $R_6$. If the wave form is negative it is shorted through rectifiers 26 and 27 and resistor $R_5$ to the positive supply. Therefore if there are no inputs through $C_1$ and $C_2$ there will be no outputs at points A and B. If there are outputs from the differentiator 19 and the phase inverter 22 and the pulses from differentiator 19 is positive and from phase inverter 22 is negative, then the diode rectifiers 24, 25, 26 and 27 will not conduct and the wave form from the square wave generator 21 will appear as pulses at points A and B. If the output phase of the square wave generator 18 leads the output phase of the square wave generator 21 by ninety degrees the wave shape 45 will be obtained and the pulses from differentiator 19 and phase inverter 22 will inhibit the conduction of the diodes 24, 25, 26 and 27 and allow a positive pulse to occur at point A and will appear to a lesser extent at point B. The outputs from points A and B are applied through leads 28 and 34 to the integrating circuits 32 and 37, respectively. The outputs of the integrating circuits are applied to the grids 33 and 38 of two triodes (connected as a difference amplifier), and the plates of the two amplifier tubes are corrected to control motor 41. Since the point A is more positive than point B the tube $V_3$ will conduct more heavily than the tube $V_4$ causing the motor 41 to run in one direction adjusting the local oscillator 44 so as to decrease the difference frequency between the mixer 11 and local standard 13. In the event that the output of the square wave generator 21 lags the output of the square wave generator 18, the wave shape 46 would be supplied to point G. The output at point A because of the inhibiting action of the differentiated pulses will be negative. These negative pulses applied as before to tubes $V_3$ and $V_4$ will cause $V_4$ to conduct more heavily than $V_3$ thus causing the motor to rotate in the opposite direction.

Figure 2 is a discriminator curve illustrating the relationship between frequency versus output of the integrating circuits 32 and 37. It is to be noted that the curves are flat-topped above a certain frequency error so that the motor 41 will run at a constant speed until it gets near the correct frequency. This is a definite advantage over the presently used alternating current motors which vary in speed with frequency.

It is seen that this invention provides an automatic frequency control circuit which allows frequency differences to be converted into direct current control voltages to vary the frequency of an oscillator and thus correct for frequency drift or error.

Although this invention has been described with respect to a preferred embodiment thereof, it is not to be so limited as changes and modifications may be made therein which are within the full intended scope of the invention, as defined by the appended claims.

I claim:

1. An automatic frequency control circuit comprising, a mixer receiving an input signal, a local oscillator supplying an input to said mixer, a pair of phase detectors receiving the output of said mixer, a local standard oscillator, the first of said phase detectors receiving an input from said local standard oscillator, a ninety degree phase shift circuit receiving an output from said local standard, a second phase detector receiving the output of said ninety degree phase shift circuit, a pair of square wave generators, the first of said square wave generators receiving the output of said first phase detector, the second square wave generator receiving the output of the second phase detector, a differentiating circuit receiving the output of said first square wave generator, a phase inverter receiving the output of said differentiating circuit, a rectifier circuit receiving a first input from said inverter and a second input from said differentiating circuit and a third input from said second square wave generator, a motor control circuit receiving the output of said rectifier circuit, and a direct current motor connected to said motor control circuit and mechanically connected to the frequency varying element of said local oscillator.

2. An automatic frequency control circuit comprising, a mixer receiving an input signal, a local oscillator supplying a second signal to said mixer, first and second phase detector receiving the output of said mixer, a local standard oscillator supplying a first input to the first phase detector, a ninety degree phase shift circuit receiving an output from said local standard oscillator and supplying an input to the second phase detector, a first square wave generator receiving the output of the first phase detector and converting it to a square wave, a second square wave generator receiving the output of the second phase detector and converting it to a square wave, a differentiator receiving the output of the first square wave generator, a phase inverter receiving the output of the differentiating circuit, a first pair of diode rectifiers connected in series between the outputs of the differentiator and phase inverter, a second pair of diode rectifiers connected in series between the differentiator and the phase inverter, a pair of resistors connected in series between the midpoints between said first and second pair of diode rectifiers, said second square wave generator connected to the junction point between the pair of resistors, a first triode tube with its control grid connected to the point between the first pair of diode rectifiers, a second triode tube with its control grid connected to the point between the second diode rectifiers, a direct current motor receiving inputs from the first and second triode tubes, and the output shaft of said direct current motor connected to the local oscillator to vary its frequency.

3. An automatic frequency control circuit comprising, a mixer receiving an input signal, a local oscillator supplying a second signal to said mixer, first and second phase detectors receiving outputs from said mixer, and local standard oscillator supplying a first input to the first phase detector, a ninety degree phase shift circuit receiving an output from said local standard oscillator and supplying an input to the second phase detector, a first square wave generator receiving the output of the first phase detector and converting it to a square wave, a second square wave generator receiving the output of the second phase detector and converting it to a square wave, a differentiator circuit receiving the output of the first square wave generator, a first phase inverter receiving the output of the differentiating circuit, a first pair of diode rectifiers connected in series between the output of the differentiator and the phase inverter, a second pair of diode rectifiers connected in series between the outputs of the differentiator circuit and the phase inverter, a pair of resistors connected in series between the midpoints of said first and second pair of diode rectifiers, said second square wave generator connected to the point between the pair of resistors, a first triode tube with its control grid connected to the point between the first pair of diode rectifiers, a second triode tube with its control grid connected to the point between the second pair of diode rectifiers, a direct current motor receiving inputs from the plate circuit of said first and second triode tubes, and the output shaft of said direct current motor connected to the local oscillator to vary its frequency.

4. An automatic frequency control circuit comprising, a mixer receiving an input signal, a local oscillator supplying an input to said mixer, a pair of phase detectors receiving the output of said mixer, a crystal oscillator supplying an input to the first phase detector, a ninety degree phase shift circuit receiving an output from said crystal oscillator and supplying an output to the second phase detector, a pair of square wave generators with the first square wave generator receiving the output of the first phase detector and the second square wave generator receiving the output of the second phase detector, a differentiating circuit receiving the output of the first square wave generator, a phase inverter receiving the output of the differentiator and inverting the phase of the output by 180 degrees, a first pair of diode rectifiers connected in series between the outputs of the differentiator and the phase inverter, a second pair of diode rectifiers connected in series between the output of the inverter and the differentiator, a pair of resistors connected between the midpoints of said first and second pair of rectifiers, the output of the second square wave generator connected to the midpoint between the pair of resistors, a direct current motor with an output shaft connected to the local oscillator to vary its frequency in response to rotation of said shaft, a pair of electron tubes connected to said direct current motor, the first electron tube connected to the midpoint between the first pair of diode rectifiers, the second electron tube connected to the point between said second pair of diode rectifiers, and a pair of filtering circuits connected respectively between ground and the control grids of said first and second electron tubes.

References Cited in the file of this patent

UNITED STATES PATENTS

| | | |
|---|---|---|
| 1,926,169 | Nyquist | Sept. 12, 1933 |
| 2,602,897 | Norton | July 8, 1952 |
| 2,617,985 | Collins | Nov. 11, 1952 |